(12) United States Patent
Goodarzi et al.

(10) Patent No.: US 11,952,037 B2
(45) Date of Patent: Apr. 9, 2024

(54) METHOD AND APPARATUS IN A MOTOR VEHICLE FOR REVERSING MULTIPLE TRAILERS

(71) Applicant: GM GLOBAL TECHNOLOGY OPERATIONS LLC, Detroit, MI (US)

(72) Inventors: Avesta Goodarzi, Whitby (CA); Ralph David Schlottke, Whitby (CA); Manvir Dulai, Brampton (CA); Michael D. Alarcon, Markham (CA); Halit Zengin, Bowmanville (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 249 days.

(21) Appl. No.: 17/658,871

(22) Filed: Apr. 12, 2022

(65) Prior Publication Data
US 2023/0322301 A1 Oct. 12, 2023

(51) Int. Cl.
| | |
|---|---|
| B62D 13/06 | (2006.01) |
| B60R 1/00 | (2022.01) |
| B60R 1/26 | (2022.01) |
| B60R 11/04 | (2006.01) |
| B62D 12/02 | (2006.01) |
| B62D 15/02 | (2006.01) |
| G06F 3/04847 | (2022.01) |
| G06V 20/56 | (2022.01) |

(52) U.S. Cl.
CPC .............. *B62D 13/06* (2013.01); *B60R 1/003* (2013.01); *B60R 1/26* (2022.01); *B60R 11/04* (2013.01); *B62D 12/02* (2013.01); *B62D 15/021* (2013.01); *B62D 15/029* (2013.01); *G06F 3/04847* (2013.01); *G06V 20/56* (2022.01); *B60R 2300/105* (2013.01); *B60R 2300/80* (2013.01)

(58) Field of Classification Search
CPC ...... B62D 13/06; B62D 12/02; B62D 15/021; B62D 15/029; B60R 1/003; B60R 1/26; B60R 11/04; B60R 2300/105; B60R 2300/80; G06F 3/04847; G06F 3/04845; G06F 3/04855; G06F 3/0488; G06V 20/56
See application file for complete search history.

(56) References Cited

U.S. PATENT DOCUMENTS 6,036,217 A * 3/2000 Burkhart, Sr. ....... B62D 53/067
280/436
10,518,831 B2 * 12/2019 Wright .................... B60L 50/60
(Continued)

*Primary Examiner* — Xiao En Mo
(74) *Attorney, Agent, or Firm* — Lorenz & Kopf LLP

(57) ABSTRACT

Systems, methods, and apparatus are provided for providing multi-trailer reverse assistance. In a multi-trailer reverse assistance system in an articulated transport system comprising a lead vehicle, an intermediate trailer, and a final trailer, the reverse assist system includes a controller. The controller is configured to: receive a view of an environment behind the final trailer; cause the view to be displayed in a display screen of a user interface device; receive, via a secondary steering device of the user interface device, a user intended direction of travel of the articulated transport system in reverse to direct the final trailer in a desired direction; continuously calculate controllable steering angles for directing the articulated transport system to direct the final trailer in the desired direction; and control the articulated transport system to direct the final trailer in the desired direction using the calculated controllable steering angles.

20 Claims, 5 Drawing Sheets

(56) References Cited

U.S. PATENT DOCUMENTS

2011/0072999 A1* 3/2011 Banwart ................ B61D 3/184
                                                                                               105/1.4
2021/0284240 A1* 9/2021 Goodarzi ............. B62D 13/005

\* cited by examiner

METHOD AND APPARATUS IN A MOTOR VEHICLE FOR REVERSING MULTIPLE TRAILERS

INTRODUCTION

The technical field generally relates to systems, methods, and apparatuses for providing an automated trailer backup system in a motor vehicle and more particularly relates to systems, methods, and apparatuses for providing an automated trailer backup system in a motor vehicle for reversing multiple trailers.

Autonomous, semi-autonomous and conventional vehicles can be designed to accommodate the towing or trailering of various loads that include without limitation: flatbeds, enclosed trailers, cargo hoppers, campers, boats, and sometimes other motorized vehicles. Also, a multitude of different trailer hitches is used in the trailering operations such as gooseneck hitches, weight distribution hitches, pintle hitches, receiver hitches, and $5^{th}$ wheel hitches. Each configuration of trailer type and hitch type displays different vehicle dynamics.

Reversing a trailer and having the trailer finish in a desired location can be a daunting task for many drivers. Trailer jackknifing is a hazard that can occur when a vehicle hitched to a trailer is reversing or backing up. When multiple trailers are being reversed, the task becomes even more daunting. In addition, driver sight lines are often obstructed by the trailers, thereby requiring a second person external to the vehicle to obtain visual confirmation and provide feedback for the driver during a reversing operation. Vehicles towing systems may be improved in a number of respects.

It is therefore desirable for improved methods, systems, and apparatuses for improving vehicle and trailer controllability during reverse driving operations. Furthermore, other desirable features and characteristics of the present disclosure will become apparent from the subsequent detailed description and the appended claims, taken in conjunction with the accompanying drawings and the foregoing technical field and background.

The information disclosed in this introduction is only for enhancement of understanding of the background of the present disclosure and therefore it may contain information that does not form the prior art that is already known in this country to a person of ordinary skill in the art.

SUMMARY

Disclosed herein are vehicle methods and systems and related control logic for vehicle systems, methods for making and methods for operating such systems, and motor vehicles equipped with onboard control systems. By way of example, and not limitation, there are presented various embodiments for an automated trailer backup system in a motor vehicle and a method for controlling an automated trailer backup for trailering operations in a motor vehicle are disclosed herein.

In one embodiment, a multi-trailer reverse assist system is provided in a lead vehicle of an articulated transport system that includes the lead vehicle, an intermediate trailer, and a final trailer. The reverse assist system includes a controller that is configured to: receive a view of an environment behind the final trailer; cause the view to be displayed in a display screen of a user interface device; receive, via a secondary steering device of the user interface device, a user intended direction of travel of the articulated transport system in reverse to direct the final trailer in a desired direction; continuously calculate controllable steering angles for directing the articulated transport system to direct the final trailer in the desired direction; and control the articulated transport system to direct the final trailer in the desired direction using the calculated controllable steering angles.

In one embodiment, the articulated transport system includes steering control in the lead vehicle and the intermediate trailer, and the controller is configured to: continuously calculate controllable steering angles for the steering control in both the lead vehicle and the intermediate trailer for directing the articulated transport system to direct the final trailer in the desired direction; and control the articulated transport system to direct the final trailer in the desired direction using the calculated controllable steering angles for the lead vehicle and the intermediate trailer.

In one embodiment, the articulated transport system includes steering control in the lead vehicle, and the controller is configured to: continuously calculate controllable steering angles for the steering control in the lead vehicle for directing the articulated transport system to direct the final trailer in the desired direction; and control the articulated transport system to direct the final trailer in the desired direction using the calculated controllable steering angles for the lead vehicle.

In one embodiment, the user interface device includes a touch screen user interface device.

In one embodiment, the secondary steering device includes a touch control slider for receiving the user intended direction of travel of the articulated transport system.

In one embodiment, the secondary steering device includes a physical knob for receiving the user intended direction of travel of the articulated transport system.

In one embodiment, the controller is configured to continuously calculate controllable steering angles for directing the articulated transport system to direct the final trailer in the desired direction based on hitch articulation angle (HAA) estimations or measurements for a first HAA between the lead vehicle and the intermediate trailer and HAA estimations or measurements for a second HAA between the intermediate trailer and the final trailer.

In one embodiment, the controller is configured to continuously calculate controllable lead vehicle steering angles ($\delta_v$) for directing the articulated transport system to direct the final trailer in the desired direction based on:

$$\delta_v = K_1(\theta_{d1} - \theta_1) + K_3(\theta_{d2} - \theta_2)$$

wherein $K_1$ and $K_3$ are constants, $\theta_{d1}$ is a desired first HAA angle, $\theta_1$ is an actual first HAA angle, $\theta_{d2}$ is a desired second HAA angle, and $\theta_2$ is an actual second HAA angle.

In one embodiment, the controller is configured to continuously calculate the desired first HAA angle $\theta_{d1}$ based on:

$$\theta_{d1} = \sin^{-1}\frac{L_1 \sin\theta_2}{\sqrt{(L_2\cos\theta_2 + D)^2 + L_1^2(\sin\theta_2)^2}} + \sin^{-1}\frac{d\sin\theta_2}{\sqrt{(L_2\cos\theta_2 + D)^2 + L_1^2(\sin\theta_2)^2}}$$

wherein d (small) is the longitudinal distance between the lead vehicle's rear axle center and vehicle-first trailer hitching point, D is the longitudinal distance between the first trailer-final trailer hitching point and the center point of final trailer axle(s), $L_1$ is the longitudinal distance between vehicle-first trailer hitching point and center point of first trailer axle(s), $L_2$ is longitudinal distance between the center point of first trailer axle(s) and the first trailer-final trailer hitching point, and $\theta_2$ is an actual second HAA angle.

In one embodiment, the controller is configured to continuously calculate the desired second HAA angle $\theta_{d2}$ based on:

$$\theta_{d2} = \sin^{-1}\frac{D\sin\varphi}{\sqrt{(l\cos\varphi+S)^2+D^2(\sin\varphi)^2}} + \sin^{-1}\frac{L_2\sin\varphi}{\sqrt{(l\cos\varphi+S)^2+D^2(\sin\varphi)^2}}$$

wherein $\varphi$ is a desired turn angle from the rear of the final trailer to direct the final trailer in the desired direction, S is a fixed calibratable value that represents the look-ahead steering distance, D is the longitudinal distance between the first trailer-final trailer hitching point and the center point of final trailer axle(s), $L_2$ is the longitudinal distance between the center point of first trailer axle(s) and the first trailer-final trailer hitching point, and l (small) is the longitudinal distance between the center point of final trailer axle(s) and the final trailer camera installation point.

In one embodiment, the multi-trailer reverse assist system further includes: a vehicle rear view camera for estimating the actual first HAA angle $\theta_1$ or an angular position sensor for measuring the actual first HAA angle $\theta_1$; an intermediate trailer camera for estimating the actual second HAA angle $\theta_2$ or an angular position sensor for measuring the actual second HAA angle $\theta_2$; and a final trailer camera for providing the view of the environment behind the final trailer.

In one embodiment, the controller is configured to continuously calculate controllable intermediate trailer steering angles ($\delta_T$) for directing the articulated transport system to direct the final trailer in the desired direction based on:

$$\delta_T = -K_2(\theta_{d2}-\theta_2)$$

wherein $K_2$ is a constant, $\theta_{d2}$ is a desired second HAA angle, and $\theta_2$ is an actual second HAA angle.

In one embodiment, the calculated controllable steering angles include controllable lead vehicle steering angles ($\delta_V$) and controllable intermediate trailer steering angles ($\delta_T$).

In one embodiment, to control the articulated transport system to direct the final trailer in the desired direction using the calculated controllable steering angles, the controller is configured to automatically control lead vehicle steering angles ($\delta_V$) and intermediate trailer steering angles ($\delta_T$).

In another embodiment, a method is provided in a vehicle having a multi-trailer reverse assist system for use with an articulated transport system that includes the vehicle, an intermediate trailer, and a final trailer. The method includes: receiving a view of an environment behind the final trailer; displaying the view in a user interface device; receiving, via a secondary steering device of the user interface device, user intended direction of travel of the articulated transport system in reverse to direct the final trailer in a desired direction; and continuously calculating controllable steering angles for directing the articulated transport system to direct the final trailer in the desired direction; wherein the calculated controllable steering angles are used to direct the final trailer in the desired direction.

In one embodiment, the articulated transport system includes steering control in both the lead vehicle and the intermediate trailer, and the method further includes: continuously calculating controllable steering angles for the steering control in both the lead vehicle and the intermediate trailer for directing the articulated transport system to direct the final trailer in the desired direction.

In one embodiment, the articulated transport system includes steering control in the lead vehicle, and method further includes: continuously calculating controllable steering angles for the steering control in the lead vehicle for directing the articulated transport system to direct the final trailer in the desired direction.

In one embodiment, the user interface device is a touch screen user interface device.

In one embodiment, the secondary steering device includes a touch control slider for receiving the user intended direction of travel of the articulated transport system.

In one embodiment, the secondary steering device includes a physical knob for receiving the user intended direction of travel of the articulated transport system.

In one embodiment, the method further includes continuously calculating controllable steering angles for directing the articulated transport system to direct the final trailer in the desired direction based on hitch articulation angle (HAA) estimations or measurements for a first HAA between the lead vehicle and the intermediate trailer and HAA estimations or measurements for a second HAA between the intermediate trailer and the final trailer.

In one embodiment, the method further includes continuously calculating controllable lead vehicle steering angles ($\delta_V$) for directing the articulated transport system to direct the final trailer in the desired direction based on:

$$\delta_V = K_1(\theta_{d1}-\theta_1)+K_3(\theta_{d2}-\theta_2)$$

wherein $K_1$ and $K_3$ are constants, $\theta_{d1}$ is a desired first HAA angle, $\theta_1$ is an actual first HAA angle, $\theta_{d2}$ is a desired second HAA angle, and $\theta_2$ is an actual second HAA angle.

In one embodiment, the method further includes continuously calculating the desired first HAA angle $\theta_{d1}$ based on:

$$\theta_{d1} = \sin^{-1}\frac{L_1\sin\theta_2}{\sqrt{(L_2\cos\theta_2+D)^2+L_1^2(\sin\theta_2)^2}} + \sin^{-1}\frac{d\sin\theta_2}{\sqrt{(L_2\cos\theta_2+D)^2+L_1^2(\sin\theta_2)^2}}$$

wherein d (small) is the longitudinal distance between the lead vehicle's rear axle center and vehicle-first trailer hitching point, D is the longitudinal distance between the first trailer-final trailer hitching point and the center point of final trailer axle(s), $L_1$ is the longitudinal distance between vehicle-first trailer hitching point and center point of first trailer axle(s), $L_2$ is longitudinal distance between the center point of first trailer axle(s) and the first trailer-final trailer hitching point, and $\theta_2$ is an actual second HAA angle.

In one embodiment, the method further includes continuously calculating the desired second HAA angle $\theta_{d2}$ based on:

$$\theta_{d2} = \sin^{-1}\frac{D\sin\varphi}{\sqrt{(l\cos\varphi+S)^2+D^2(\sin\varphi)^2}} + \sin^{-1}\frac{L_2\sin\varphi}{\sqrt{(l\cos\varphi+S)^2+D^2(\sin\varphi)^2}}$$

wherein $\varphi$ is a desired turn angle from the rear of the final trailer to direct the final trailer in the desired direction, S is a fixed calibratable value that represents the look-ahead steering distance, D is the longitudinal distance between the first trailer-final trailer hitching point and the center point of final trailer axle(s), $L_2$ is the longitudinal distance between the center point of first trailer axle(s) and the first trailer-final trailer hitching point, and l (small) is the longitudinal distance between the center point of final trailer axle(s) and the final trailer camera installation point.

In one embodiment, the method further includes estimating the actual first HAA angle $\theta_1$ using a vehicle rear view camera, estimating the actual second HAA angle $\theta_2$ using an intermediate trailer camera; and receiving the view of the environment behind the final trailer from a final trailer camera.

In one embodiment, the method further includes continuously calculating controllable intermediate trailer steering angles ($\delta_T$) for directing the articulated transport system to direct the final trailer in the desired direction based on:

$$\delta_T = -K_2(\theta_{d2} - \theta_2)$$

wherein $K_2$ is a constant, $\theta_{d2}$ is a desired second HAA angle, and $\theta_2$ is an actual second HAA angle.

In one embodiment, continuously calculating controllable steering angles includes continuously calculating controllable lead vehicle steering angles ($\delta_V$) and controllable intermediate trailer steering angles ($\delta_T$).

In one embodiment, controlling the articulated transport system to direct the final trailer in the desired direction using the calculated controllable steering angles includes automatically controlling lead vehicle steering angles ($\delta_v$) and intermediate trailer steering angles ($\delta_T$).

In another embodiment, a vehicle having a multi-trailer reverse assist system for use with an articulated transport system that includes the vehicle, an intermediate trailer, and a final trailer is provided. The vehicle includes: a vehicle rear view camera for estimating a first hitch articulation angle (HAA) angle $\theta_1$ between the vehicle and the intermediate trailer; an intermediate trailer camera for estimating a second HAA angle $\theta_2$ between the intermediate trailer and the final trailer; a final trailer camera for providing a view of an environment behind the final trailer; and a controller. The controller is configured to: receive the view of the environment behind the final trailer from the final trailer camera; cause the view to be displayed in a user interface device; receive, via a secondary steering device, a user intended direction of travel of the articulated transport system in reverse to direct the final trailer in a desired direction; continuously calculate controllable steering angles that include controllable lead vehicle steering angles ($\delta_v$) and optionally a controllable intermediate trailer steering angles ($\delta_T$) for directing the articulated transport system to direct the final trailer in the desired direction based on the first HAA angle $\theta_1$ between the vehicle and the intermediate trailer estimated using the vehicle rear view camera and the second HAA angle $\theta_2$ between the intermediate trailer and the final trailer estimated using the intermediate trailer camera; and control the articulated transport system to direct the final trailer in the desired direction using the calculated controllable steering angles.

In one embodiment, the articulated transport system includes steering control in the lead vehicle and the intermediate trailer, and the controller is configured to: continuously calculate controllable steering angles for the steering control in both the lead vehicle and the intermediate trailer for directing the articulated transport system to direct the final trailer in the desired direction; and control the articulated transport system to direct the final trailer in the desired direction using the calculated controllable steering angles for the lead vehicle and the intermediate trailer.

In one embodiment, the articulated transport system includes steering control in the lead vehicle, and the controller is configured to: continuously calculate controllable steering angles for the steering control in the lead vehicle for directing the articulated transport system to direct the final trailer in the desired direction; and control the articulated transport system to direct the final trailer in the desired direction using the calculated controllable steering angles for the lead vehicle.

In one embodiment, the secondary steering device includes a touch control slider for receiving the user intended direction of travel of the articulated transport system.

In one embodiment, the secondary steering device includes a physical knob for receiving the user intended direction of travel of the articulated transport system.

In one embodiment, the controller is configured to continuously calculate controllable steering angles for directing the articulated transport system to direct the final trailer in the desired direction based on hitch articulation angle (HAA) estimations or measurements for a first HAA between the lead vehicle and the intermediate trailer and HAA estimations or measurements for a second HAA between the intermediate trailer and the final trailer.

In one embodiment, the controller is configured to continuously calculate controllable lead vehicle steering angles ($\delta_v$) for directing the articulated transport system to direct the final trailer in the desired direction based on:

$$\delta_V = K_1(\theta_{d1} - \theta_1) + K_3(\theta_{d2} - \theta_2)$$

wherein $K_1$ and $K_3$ are constants, $\theta_{d1}$ is a desired first HAA angle, $\theta_1$ is an actual first HAA angle, $\theta_{d2}$ is a desired second HAA angle, and $\theta_2$ is an actual second HAA angle.

In one embodiment, the controller is configured to continuously calculate the desired first HAA angle $\theta_{d1}$ based on:

$$\theta_{d1} = \sin^{-1}\frac{L_1\sin\theta_2}{\sqrt{(L_2\cos\theta_2 + D)^2 + L_1^2(\sin\theta_2)^2}} + \sin^{-1}\frac{d\sin\theta_2}{\sqrt{(L_2\cos\theta_2 + D)^2 + L_1^2(\sin\theta_2)^2}}$$

wherein d (small) is the longitudinal distance between the lead vehicle's rear axle center and vehicle-first trailer hitching point, D is the longitudinal distance between the first trailer-final trailer hitching point and the center point of final trailer axle(s), $L_1$ is the longitudinal distance between vehicle-first trailer hitching point and center point of first trailer axle(s), $L_2$ is longitudinal distance between the center point of first trailer axle(s) and the first trailer-final trailer hitching point, and $\theta_2$ is an actual second HAA angle.

In one embodiment, the controller is configured to continuously calculate the desired second HAA angle $\theta_{d2}$ based on:

$$\theta_{d2} = \sin^{-1}\frac{D\sin\varphi}{\sqrt{(l\cos\varphi + S)^2 + D^2(\sin\varphi)^2}} + \sin^{-1}\frac{L_2\sin\varphi}{\sqrt{(l\cos\varphi + S)^2 + D^2(\sin\varphi)^2}}$$

wherein $\varphi$ is a desired turn angle from the rear of the final trailer to direct the final trailer in the desired direction, S is a fixed calibratable value that represents the look-ahead steering distance, D is the longitudinal distance between the first trailer-final trailer hitching point and the center point of final trailer axle(s), $L_2$ is the longitudinal distance between the center point of first trailer axle(s) and the first trailer-final trailer hitching point, and l (small) is the longitudinal distance between the center point of final trailer axle(s) and the final trailer camera installation point.

In one embodiment, the controller is configured to continuously calculate controllable intermediate trailer steering angles ($\delta_T$) for directing the articulated transport system to direct the final trailer in the desired direction based on:

$$\delta_T = -K_2(\theta_{d2} - \theta_2)$$

wherein $K_2$ is a constant, $\theta_{d2}$ is a desired second HAA angle, and $\theta_2$ is an actual second HAA angle.

In one embodiment, the calculated controllable steering angles include controllable lead vehicle steering angles ($\delta_v$) and controllable intermediate trailer steering angles ($\delta_T$).

In one embodiment, to control the articulated transport system to direct the final trailer in the desired direction using the calculated controllable steering angles, the controller is configured to automatically control lead vehicle steering angles ($\delta_v$) and intermediate trailer steering angles ($\delta_T$).

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1A:
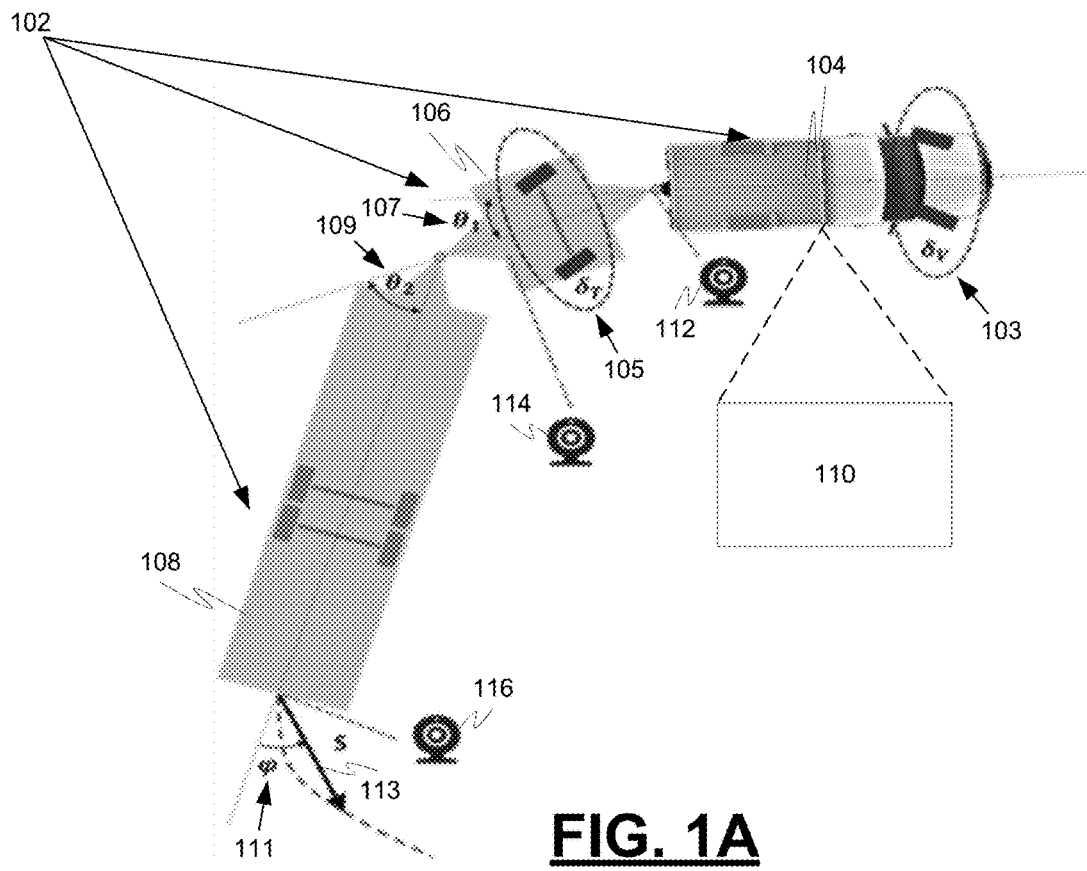
FIG. 1A is a diagram depicting an example articulated transport system, in accordance with an embodiment.

FIG. 1A is a diagram depicting an example articulated transport system 102. The example articulated transport system 102 includes a towing or lead vehicle 104, an intermediate trailer 106, and a final trailer 108. The lead vehicle 104 is equipped with an example multi-trailer reverse assist system 110 for automatically adjusting vehicle dynamics during trailer backup operations to control the example articulated transport system 102 to direct the final trailer in a desired direction while traveling in reverse. The desired direction, in this example, includes a desired turn angle ($\varphi$) 111 for the rear trailer 108 and a fixed calibratable value (S) 113 that represents a look-ahead steering distance for the rear trailer 108. The desired turn angle ($\varphi$) 111 may be calculated based on input from a secondary steering device.

The example multi-trailer reverse assist system 110 is configured to continuously calculate controllable steering angles for directing the articulated transport system 102 to direct the final trailer in the desired direction and control the articulated transport system 102 to direct the final trailer in the desired direction using the calculated controllable steering angles. The example multi-trailer reverse assist system 110 is configured to continuously calculate controllable steering angles for directing the articulated transport system 102 to direct the final trailer in the desired direction based on hitch articulation angle (HAA) estimates (or measurements) for a first HAA ($\theta_1$) 107 between the lead vehicle 104 and the intermediate trailer 106 and HAA estimates (or measurements) for a second HAA ($\theta_2$) 109 between the intermediate trailer 106 and the final trailer 108.

The example articulated transport system 102 includes a first imaging device 112 (e.g., camera) for estimating the first HAA ($\theta_1$) 107 and a second imaging device 114 for estimating the second HAA ($\theta_2$) 109. Alternatively or additionally, ultra-sonic sensors may be used to measure the first HAA ($\theta_1$) 107 and the second HAA ($\theta_2$) 109. The example articulated transport system 102 further includes a third imaging device 116 for providing a view of the environment behind the final trailer 108.

The imaging device 112 may include a camera mounted to the rear of the lead vehicle, the imaging device 114 may be a camera mounted to the rear of the intermediate trailer, and the imaging device 116 may be a camera mounted to the rear of the final trailer. Alternatively, the imaging devices 112, 114, and/or 116 may be one or more of a plurality of mounted cameras operative to capture images of an individual camera field of view (FOV). Images from the imaging devices 112, 114, and/or 116 may be augmented with data from ultra-sonic sensors, a lidar, or radar to provide depth information and information on obscured or partially obscured areas of the image or areas low light or over saturated areas of the image. The imaging devices 112, 114, and/or 116 may further include Lidar operative to capture depth information to objects and surfaces within the camera FOV. The imaging devices 112, 114, and/or 116 may include other depth sensing or imaging technology such a set of stereo cameras, or high resolution ultrasound.

In the example of FIG. 1A, the articulated transport system 102 has two controllable steering angles, a lead vehicle steering angle ($\delta_v$) 103 and an intermediate trailer steering angle ($\delta_T$) 105. The example multi-trailer reverse assist system 110 is configured to continuously calculate the lead vehicle steering angles ($\delta_v$) 103 and intermediate trailer steering angles ($\delta_T$) 105 for directing the articulated transport system 102 to direct the final trailer in the desired direction.

While the foregoing example depicts an example articulated transport system 102 that includes two trailers, one intermediate trailer 106 and a final trailer 108, in other examples, the articulated transport system 102 may include additional intermediate trailers. Regardless of the number of trailers in the articulated transport system, the multi-trailer reverse assist system 110 is configured to calculate the continuously calculate controllable steering angles for directing the articulated transport system to direct the final trailer in a desired direction based on hitch articulation angle (HAA) estimates (or measurements) between the lead vehicle and various trailers in the articulated transport system.

Figure 1B:
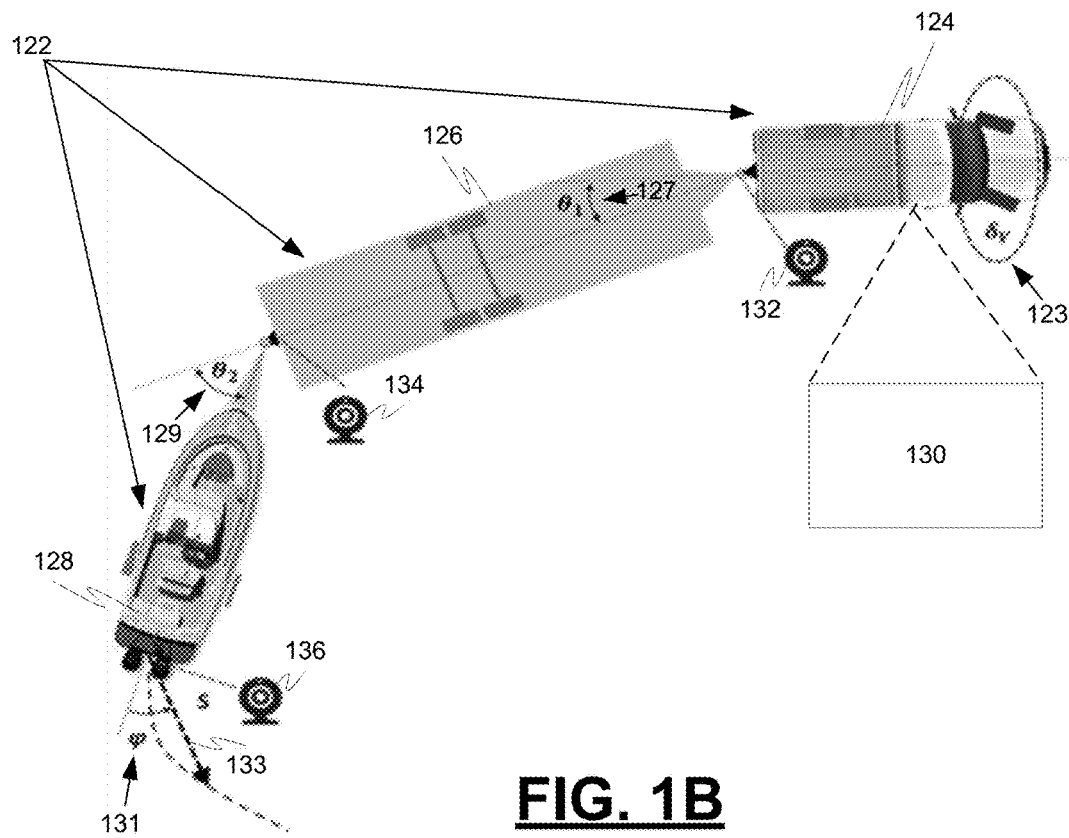
FIG. 1B is a diagram depicting another example articulated transport system, in accordance with an embodiment.

FIG. 1B is a diagram depicting another example articulated transport system 122. The example articulated transport system 122 includes a towing or lead vehicle 124, an intermediate trailer 126, and a final trailer 128. The lead vehicle 124 is equipped with an example multi-trailer reverse assist system 130 for automatically adjusting vehicle dynamics during trailer backup operations to control the example articulated transport system 122 to direct the final trailer in a desired direction while traveling in reverse. The desired direction, in this example, includes a desired turn angle ($\varphi$) 131 for the rear trailer 128 and a fixed calibratable value (S) 133 that represents a look-ahead steering distance for the rear trailer 128. The desired turn angle ($\varphi$) 131 may be calculated based on input from a secondary steering device.

The example multi-trailer reverse assist system 130 is configured to continuously calculate controllable steering angles for directing the articulated transport system 122 to direct the final trailer in the desired direction and control the articulated transport system 122 to direct the final trailer in the desired direction using the calculated controllable steering angles. The example multi-trailer reverse assist system 130 is configured to continuously calculate controllable steering angles for directing the articulated transport system 122 to direct the final trailer in the desired direction based on hitch articulation angle (HAA) estimates (or measurements) for a first HAA ($\theta_1$) 127 between the lead vehicle 104 and the intermediate trailer 126 and HAA estimates (or measurements) for a second HAA ($\theta_2$) 129 between the intermediate trailer 126 and the final trailer 128.

The example articulated transport system 122 includes a first imaging device 132 (e.g., camera) for estimating the first HAA ($\theta_1$) 127 and a second imaging device 134 for estimating the second HAA ($\theta_2$) 129. Alternatively or additionally, ultra-sonic sensors may be used to measure the first HAA ($\theta_1$) 127 and the second HAA ($\theta_2$) 129. The example articulated transport system 122 further includes a third imaging device 136 for providing a view of the environment behind the final trailer 128.

In the example of FIG. 1B, the articulated transport system 102 has one controllable steering angle, a lead vehicle steering angle ($\delta_v$) 123. The example multi-trailer reverse assist system 130 is configured to continuously calculate the lead vehicle steering angle ($\delta_v$) 123 for directing the articulated transport system 122 to direct the final trailer in the desired direction.

While the foregoing example depicts an example articulated transport system 122 that includes two trailers, one intermediate trailer 126 and a final trailer 128, in other examples, the articulated transport system 122 may include additional intermediate trailers. Regardless of the number of trailers in the articulated transport system, the multi-trailer reverse assist system 130 is configured to calculate the continuously calculate controllable steering angles for directing the articulated transport system to direct the final trailer in a desired direction based on hitch articulation angle (HAA) estimates (or measurements) between the lead vehicle and various trailers in the articulated transport system.

Figure 2:
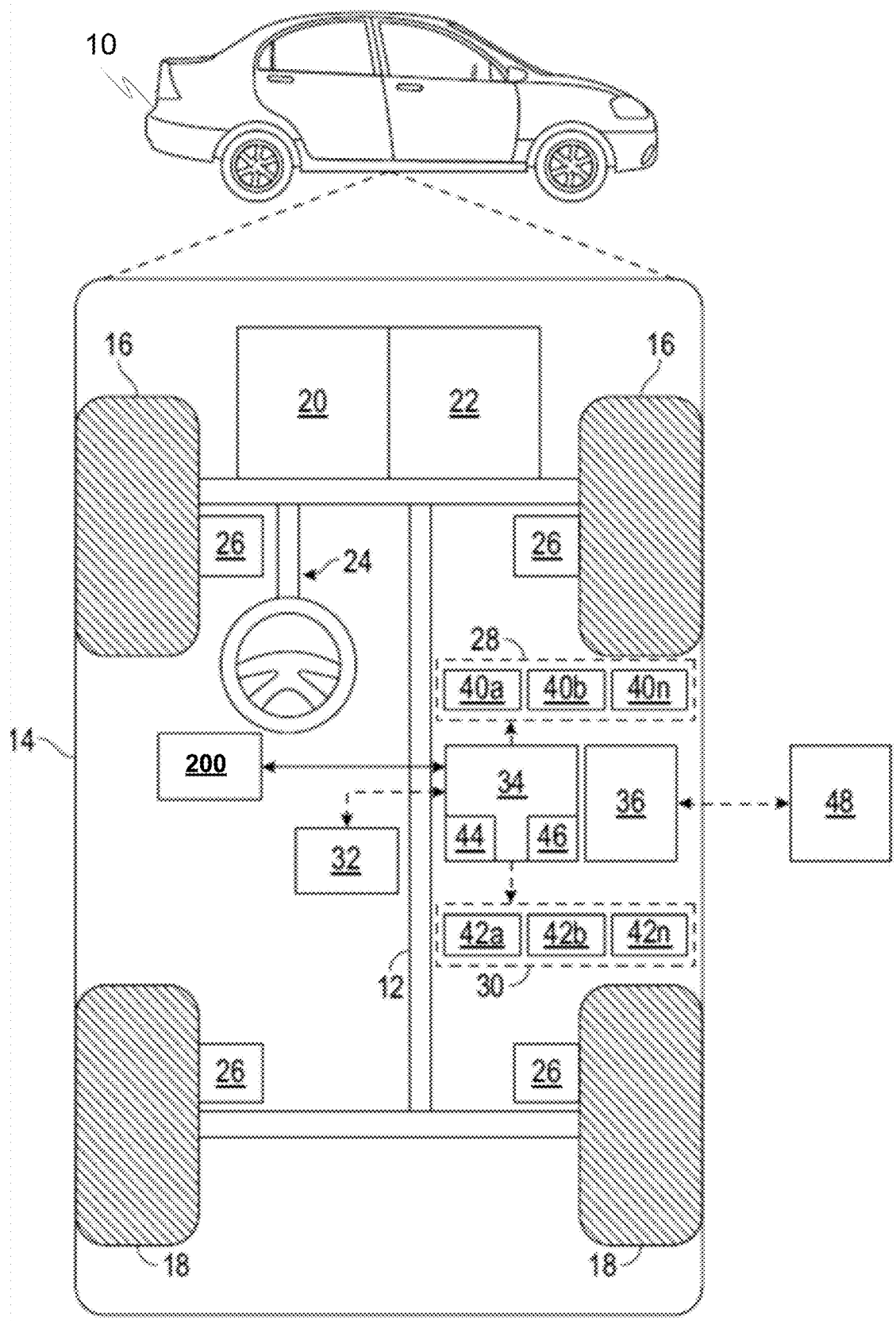
FIG. 2 is a block diagram depicting an example vehicle that includes a multi-trailer reverse assist system for automatically adjusting vehicle dynamics during trailer backup operations to control an articulated transport system, in accordance with an embodiment.

FIG. 2 is a block diagram depicting an example vehicle 10 that includes a multi-trailer reverse assist system 200 for automatically adjusting vehicle dynamics during trailer backup operations to control an articulated transport system that includes at least the example vehicle 10, an intermediate trailer, and a final trailer to direct the final trailer in a desired direction. The example multi-trailer reverse assist system 200 is configured to continuously calculate controllable steering angles for directing the articulated transport system to direct the final trailer in the desired direction and control the articulated transport system to direct the final trailer in the desired direction using the calculated controllable steering angles.

As depicted in FIG. 2, the example vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. The vehicle 10 is depicted in the illustrated embodiment as a passenger car, but other vehicle types, including trucks, sport utility vehicles (SUVs), recreational vehicles (RVs), etc., may also be used. The vehicle 10 may be capable of being driven manually, autonomously and/or semi-autonomously.

The vehicle 10 further includes a propulsion system 20, a transmission system 22 to transmit power from the propulsion system 20 to vehicle wheels 16-18, a steering system 24 to influence the position of the vehicle wheels 16-18, a brake system 26 to provide braking torque to the vehicle wheels 16-18, a sensor system 28, an actuator system 30, at least one data storage device 32, at least one controller 34, and a communication system 36 that is configured to wirelessly communicate information to and from other entities 48.

The sensor system 28 includes one or more sensing devices 40a-40r that sense observable conditions of the exterior environment and/or the interior environment of the autonomous vehicle 10. The sensing devices 40a-40r can include but are not limited to, radars, lidars, global positioning systems, optical cameras, thermal cameras, ultra-sonic sensors (e.g., 40o-40r), inertial measurement units, Ultra-Wideband sensors, and/or other sensors. The actuator system 30 includes one or more actuator devices 42a-42n that control one or more vehicle features such as, but not limited to, the propulsion system 20, the transmission system 22, the steering system 24, and the brake system 26.

The data storage device 32 stores data for use in automatically controlling the vehicle 10. The data storage device 32 may be part of the controller 34, separate from the controller 34, or part of the controller 34 and part of a separate system. The controller 34 includes at least one processor 44 and a computer-readable storage device or media 46. Although only one controller 34 is shown in FIG. 2, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

The processor 44 can be any custom made or commercially available processor, a central processing unit (CPU), a graphics processing unit (GPU), an auxiliary processor among several processors associated with the controller 34, a semiconductor-based microprocessor (in the form of a microchip or chipset), a macro processor, any combination thereof, or generally any device for executing instructions. The computer-readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of several known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34.

The programming instructions may include one or more separate programs, each of which comprises an ordered listing of executable instructions for implementing logical functions. The one or more instructions of the controller 34, when executed by the processor 44, may configure the vehicle 10 to continuously calculate controllable steering angles for directing the articulated transport system to direct the final trailer in a desired direction and control the articulated transport system to direct the final trailer in the desired direction using the calculated controllable steering angles.

The multi-trailer reverse assist system 200 may include any number of sub-modules embedded within the controller 34, which may be combined and/or further partitioned to similarly implement systems and methods described herein. Additionally, inputs to the multi-trailer reverse assist system 200 may be received from the sensor system 28, received from other control modules (not shown) associated with the vehicle 10, and/or determined/modeled by other sub-modules (not shown) within the controller 34 of FIG. 2. Furthermore, the inputs might also be subjected to preprocessing, such as sub-sampling, noise-reduction, normalization, feature-extraction, missing data reduction, and the like.

Figure 3:
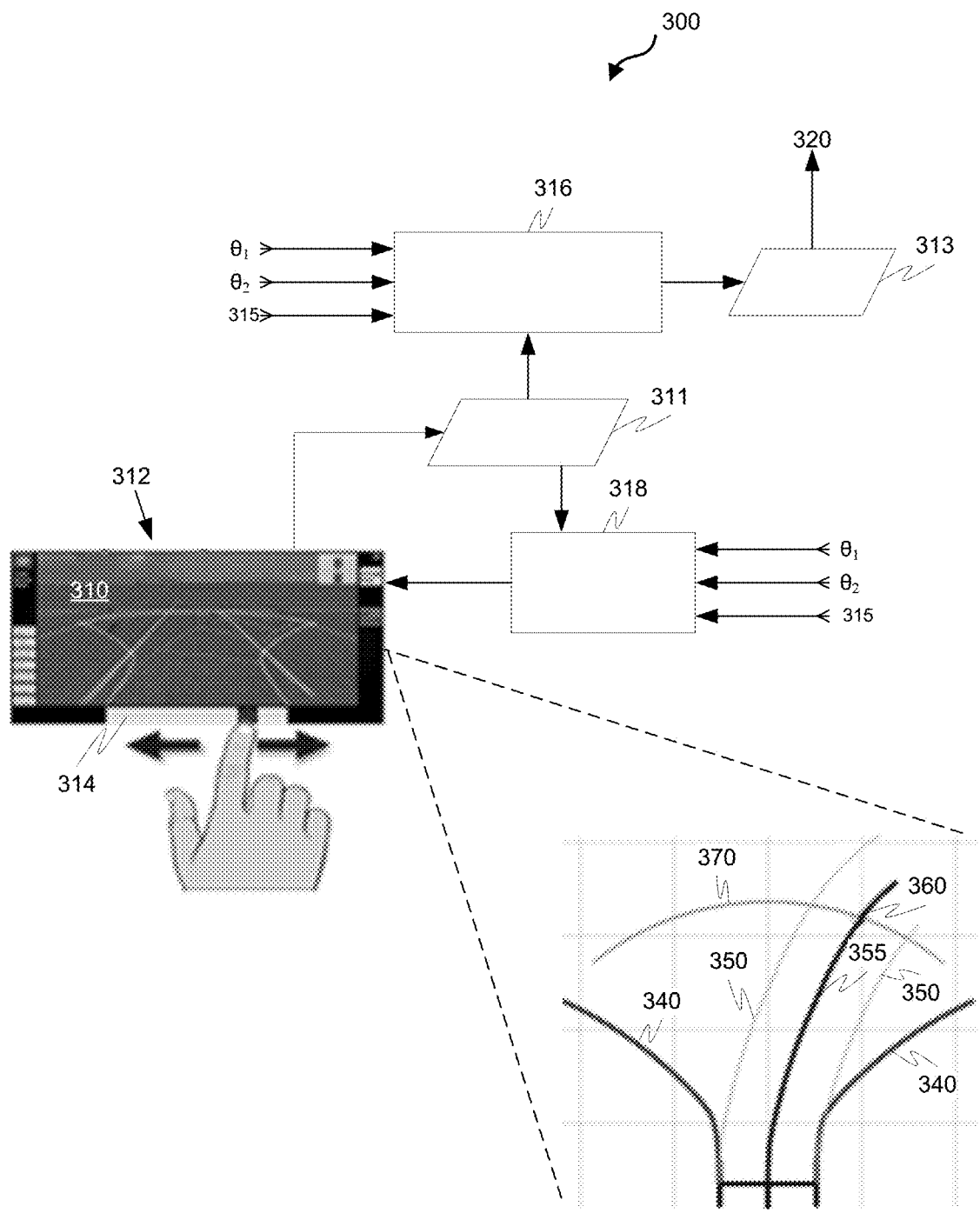
FIG. 3 is a block diagram depicting an example multi-trailer reverse assist system in a lead vehicle in an articulated transport system, in accordance with an embodiment.

FIG. 3 is a block diagram depicting an example multi-trailer reverse assist system 300 in a lead vehicle (e.g., 104 or 124) in an articulated transport system (e.g., 102 or 122) comprising the lead vehicle (e.g., 104 or 124), an intermediate trailer (e.g., 106 or 126), and a final trailer (e.g., 108 or 128). The example multi-trailer reverse assist system 300 is configured to configured to continuously calculate controllable steering angles for directing the articulated transport system (e.g., 102 or 122) to direct the final trailer in a desired direction in reverse and control the articulated transport system (e.g., 102 or 122) to direct the final trailer in the desired direction using the calculated controllable steering angles. The example multi-trailer reverse assist system receives a view of an environment behind the final trailer (e.g., 108 or 128), causes the view to be displayed in a display screen 310 of a user interface device 312, receives, via a secondary steering device 314 (e.g., touch control slider as illustrated or a knob) of the user interface device 312, a user intended direction of travel of the articulated transport system in reverse to direct the final trailer in a desired direction, continuously calculates controllable steering angles for directing the articulated transport system to direct the final trailer in the desired direction, and controls the articulated transport system to direct the final trailer in the desired direction using the calculated controllable steering angles. The example multi-trailer reverse assist system 300 includes a steering control module 316 and a margins and path calculation module 318. The example steering control module 316 and margins and path calculation module 318 are implemented by one or more controller(s) 34.

The example user interface device 312 facilitates a driver's selection of a trailer destination through the display screen 310 using a touch control slider 314, while having the final trailer rear view, augmented with active guidance indicators indicating a target point 360, maneuverability margins 340, projected trailer path 350, target line 355 indicative of a current desired navigation centerline and destination for the final trailer, and sensor detection range 370. Using the example user interface device 312, the driver may use the touch control sider 314 to establish a location of the target point 360 within the maneuverability margins 340. While adjusting the target point 360 using the touch control sider 314, the projected trailer path 350 and target line 355 are updated indicating to the driver the navigation route to be travelled by the trailer on the way to target point 360 such that potential obstacles may be predicted by the driver while establishing the target point 360.

The example margins and path calculation module 318 is configured to generate the maneuverability margins 340, projected trailer path 350, target line 355 indicative of a current desired navigation centerline and destination for the final trailer, and look ahead sensor range (S) 370 (wherein S is a calibratable fixed value), the first HAA ($\theta_1$) (e.g., 107 or 127), the second HAA ($\theta_2$) (e.g., 109 or 129), and trailer dimensions 315.

When using the example user interface device 312, maneuverability margins 340, the target point 360, and projected path 350 including the target line 355 are displayed to the driver while the driver is determining the target point 360. The driver can determine the direction using the user interface device 312 and a vehicle motion control system 320 may then direct the final trailer to that direction by using calculated steering angles.

The steering control module 316, based on target point coordinates 311 of the target point 360, the first HAA ($\theta_1$) (e.g., 107 or 127), the second HAA ($\theta_2$) (e.g., 109 or 129), and trailer dimensions 315, is configured to generate steering angles 313 (e.g., the lead vehicle steering angles ($\delta_v$) 103 and intermediate trailer steering angles ($\delta_T$) 105 for an articulated transport system 102, or the lead vehicle steering angles ($\delta_v$) 123 for an articulated transport system 122) for controlling the articulated transport system to direct the final trailer in the desired direction.

Figure 4:
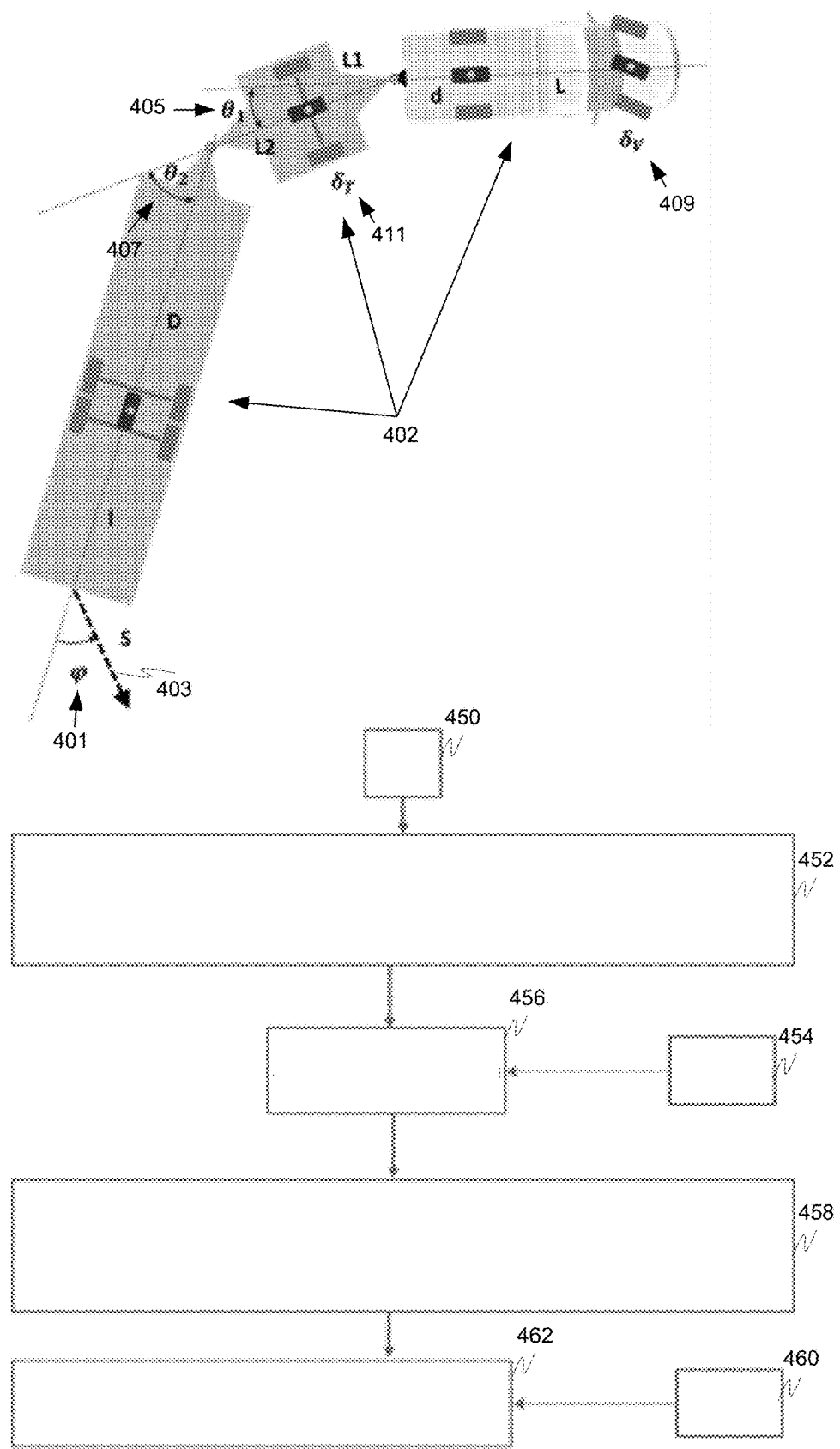
FIG. 4 is a block diagram depicting example operations performed by an example steering control module to generate steering angles for use by a vehicle motion control system for controlling an articulated transport system, in accordance with an embodiment.

FIG. 4 is a block diagram depicting example operations performed by an example steering control module (e.g., 316) for controlling an articulated transport system 402 to direct the final trailer in the desired direction using calculated steering angles. The example steering control module uses a desired turn angle (φ) 401, a calibratable fixed value (S) 403, a first HAA (θ$_1$) 405, a second HAA (θ$_2$) 407, and trailer dimensions to generate steering angles—lead vehicle steering angles (δ$_V$) 409 and intermediate trailer steering angles (δ$_T$) 411—for the articulated transport system 402.

A desired turn angle (φ) 401 is received (operation 450). The desired turn angle (φ) 401 may be calculated based on position input from a secondary steering device (e.g., position indicated by the secondary steering device 314).

A desired second HAA (θ$_{d2}$) is determined (operation 452) based on the desired turn angle (φ) 401, a fixed calibratable value (S) 403 that represents the look-ahead steering distance, and trailer dimensions D,l, and L$_2$, wherein D is the longitudinal distance between the first trailer-final trailer hitching point and the center point of final trailer axle(s), L$_2$ is the longitudinal distance between the center point of first trailer axle(s) and the first trailer-final trailer hitching point, and l (small) is the longitudinal distance between the center point of final trailer axle(s) and the final trailer camera installation point. In this example, the desired second HAA (θ$_{d2}$) is determined based on:

$$\theta_{d2} = \sin^{-1}\frac{D\sin\varphi}{\sqrt{(l\cos\varphi+S)^2 + D^2(\sin\varphi)^2}} + \sin^{-1}\frac{L_2\sin\varphi}{\sqrt{(l\cos\varphi+S)^2 + D^2(\sin\varphi)^2}}$$

The second HAA (θ$_2$) 407 is received (operation 454) and the intermediate trailer steering angles (δ$_T$) 411 are determined (operation 456) based on the second HAA (θ$_2$) 407 and the desired second HAA (θ$_{d2}$). In this example, the intermediate trailer steering angles (δ$_T$) 411 is determined based on a difference between the second HAA (θ$_2$) 407 and the desired second HAA (θ$_{d2}$):

δ$_T$=−K$_2$ (θ$_{d2}$−θ$_2$), wherein K$_2$ is a constant.

A desired first HAA (θ$_{d1}$) is determined (operation 458) based on the intermediate trailer steering angles (δ$_T$) 411, the second HAA (θ$_2$) 407, and trailer dimensions d, D, L$_1$, and L$_2$, wherein d (small) is the longitudinal distance between the lead vehicle's rear axle center and vehicle-first trailer hitching point, D is the longitudinal distance between the first trailer-final trailer hitching point and the center point of final trailer axle(s), L$_1$ is the longitudinal distance between vehicle-first trailer hitching point and center point of first trailer axle(s), and L$_2$ is longitudinal distance between the center point of first trailer axle(s) and the first trailer-final trailer hitching point. In this example, the desired first HAA (θ$_{d1}$) is determined based on:

$$\theta_{d1} = \sin^{-1}\frac{L_1\sin\theta_2}{\sqrt{(L_2\cos\theta_2+D)^2 + L_1^2(\sin\theta_2)^2}} + \sin^{-1}\frac{d\sin\theta_2}{\sqrt{(L_2\cos\theta_2+D)^2 + L_1^2(\sin\theta_2)^2}}$$

The first HAA (θ$_1$) 405 is received (operation 460) and the lead vehicle steering angles (δ$_V$) 411 are determined (operation 462) based on the first HAA (θ$_1$) 405, the second HAA (θ$_2$) 407, the desired first HAA (θ$_{d1}$), and the desired second HAA (θ$_{d2}$). In this example, the lead vehicle steering angles (δ$_V$) 409 is determined based on a difference between the first HAA (θ$_1$) 405 and the desired first HAA (θ$_{d1}$) and a difference between the second HAA (θ$_2$) 407 and the desired second HAA (θ$_{d2}$):

δ$_V$=K$_1$ (θ$_{d1}$−θ$_1$)+K$_2$ (θ$_{d2}$−θ$_2$), wherein K$_1$ and K$_3$ are constants.

Figure 5:
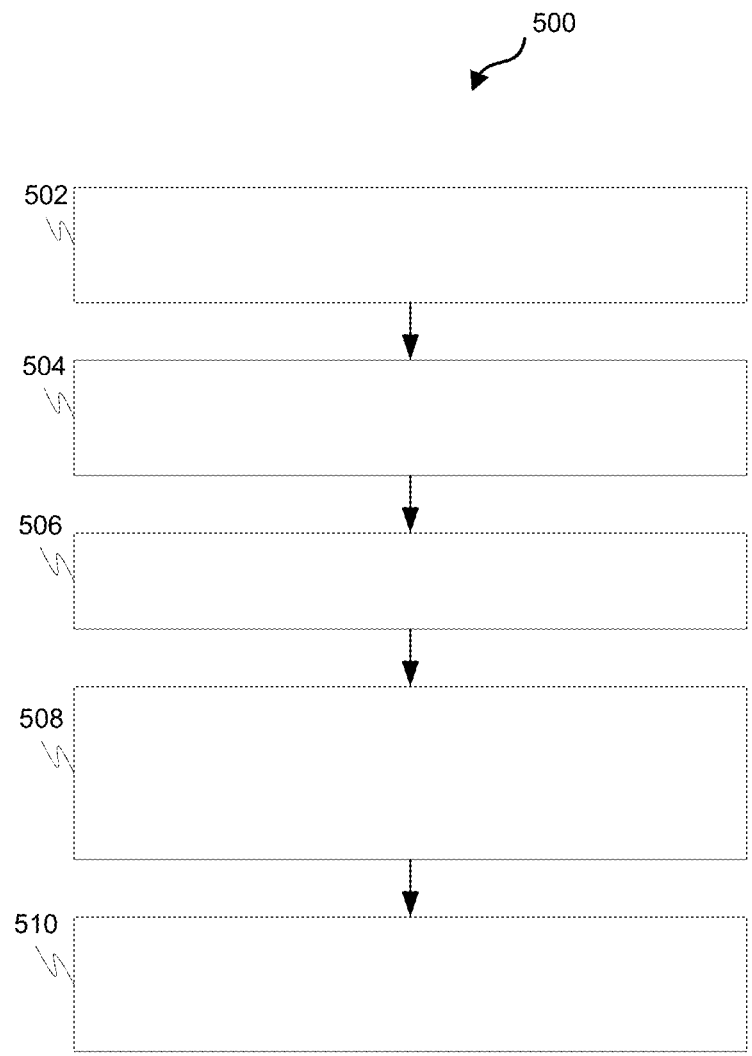
FIG. 5 is a process flow chart depicting an example process in a vehicle having a multi-trailer reverse assist system for use with an articulated transport system, in accordance with an embodiment.

FIG. 5 is a process flow chart depicting an example process 500 in a vehicle having a multi-trailer reverse assist system for use with an articulated transport system comprising the vehicle, an intermediate trailer, and a final trailer. The order of operation within process 500 is not limited to the sequential execution as illustrated in the FIG. 5 but may be performed in one or more varying orders as applicable and in accordance with the present disclosure.

The example process 500 includes receiving a view of the environment behind the final trailer (operation 502) and displaying the view in a user interface device (operation 504). The example process 500 includes receiving a user intended direction of travel of the articulated transport system in reverse (operation 506). The user intended direction of travel may be received from a secondary steering device, such as a touch control slider in a touch screen user interface device for receiving user selection of the intended direction of travel of the articulated transport system. The secondary steering device may include a physical knob for receiving user selection of the intended direction of travel of the articulated transport system.

The example process 500 includes continuously calculating controllable steering angles for directing the articulated transport system to direct the final trailer in the desired direction (operation 508). The continuously calculating controllable steering angles may include continuously calculating controllable steering angles for steering control in both the lead vehicle and the intermediate trailer when the articulated transport system includes steering control in both the lead vehicle and the intermediate trailer. The continuously calculating controllable steering angles may include continuously calculating controllable steering angles for steering control in only the lead vehicle when the articulated transport system includes steering control in only the lead vehicle. The continuously calculating controllable steering angles for directing the articulated transport system to direct the final trailer in the desired direction may be based on hitch articulation angle (HAA) estimations or measurements for a first HAA between the lead vehicle and the intermediate trailer and HAA estimations or measurements for a second HAA between the intermediate trailer and the final trailer.

The example process 500 includes controlling the articulated transport system to direct the final trailer in the desired direction using the calculated controllable steering angles (operation 510).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A multi-trailer reverse assist system in an articulated transport system comprising a lead vehicle, an intermediate trailer, and a final trailer, the reverse assist system comprising a controller, the controller configured to:
- receive a view of an environment behind the final trailer;
- cause the view to be displayed in a display screen of a user interface device;
- receive, via a secondary steering device of the user interface device, a user intended direction of travel of the articulated transport system in reverse to direct the final trailer in a desired direction;
- continuously calculate controllable steering angles for directing the articulated transport system to direct the final trailer in the desired direction; and
- control the articulated transport system to direct the final trailer in the desired direction using the calculated controllable steering angles.

2. The multi-trailer reverse assist system of claim 1, wherein the articulated transport system includes steering control in the lead vehicle and the intermediate trailer, and wherein the controller is configured to:
- continuously calculate controllable steering angles for the steering control in both the lead vehicle and the intermediate trailer for directing the articulated transport system to direct the final trailer in the desired direction; and
- control the articulated transport system to direct the final trailer in the desired direction using the calculated controllable steering angles for the lead vehicle and the intermediate trailer.

3. The multi-trailer reverse assist system of claim 1, wherein the articulated transport system includes steering control in the lead vehicle, and wherein the controller is configured to:
- continuously calculate controllable steering angles for the steering control in the lead vehicle for directing the articulated transport system to direct the final trailer in the desired direction; and
- control the articulated transport system to direct the final trailer in the desired direction using the calculated controllable steering angles for the lead vehicle.

4. The multi-trailer reverse assist system of claim 1, wherein the secondary steering device comprises a touch control slider for receiving the user intended direction of travel of the articulated transport system.

5. The multi-trailer reverse assist system of claim 1, wherein the controller is configured to continuously calculate controllable steering angles for directing the articulated transport system to direct the final trailer in the desired direction based on hitch articulation angle (HAA) estimations or measurements for a first HAA between the lead vehicle and the intermediate trailer and HAA estimations or measurements for a second HAA between the intermediate trailer and the final trailer.

6. The multi-trailer reverse assist system of claim 5, wherein the controller is configured to continuously calculate controllable lead vehicle steering angles ($\delta_V$) for directing the articulated transport system to direct the final trailer in the desired direction based on:

$$\delta_V = K_1(\theta_{d1} - \theta_1) + K_3(\theta_{d2} - \theta_2)$$

wherein $K_1$ and $K_3$ are constants, $\theta_{d1}$ is a desired first HAA angle, $\theta_1$ is an actual first HAA angle, $\theta_{d2}$ is a desired second HAA angle, and $\theta_2$ is an actual second HAA angle.

7. The multi-trailer reverse assist system of claim 6, wherein the controller is configured to continuously calculate the desired first HAA angle $\theta_{d1}$ based on:

$$\theta_{d1} = \sin^{-1}\frac{L_1\sin\theta_2}{\sqrt{(L_2\cos\theta_2 + D)^2 + L_1^2(\sin\theta_2)^2}} + \sin^{-1}\frac{d\sin\theta_2}{\sqrt{(L_2\cos\theta_2 + D)^2 + L_1^2(\sin\theta_2)^2}}$$

wherein d (small) is the longitudinal distance between the lead vehicle's rear axle center and vehicle-first trailer hitching point, D is the longitudinal distance between the first trailer-final trailer hitching point and the center point of final trailer axle(s), $L_1$ is the longitudinal distance between vehicle-first trailer hitching point and center point of first trailer axle(s), $L_2$ is longitudinal distance between the center point of first trailer axle(s) and the first trailer-final trailer hitching point, and $\theta_2$ is an actual second HAA angle.

8. The multi-trailer reverse assist system of claim 6, wherein the controller is configured to continuously calculate the desired second HAA angle $\theta_{d2}$ based on:

$$\theta_{d2} = \sin^{-1}\frac{D\sin\varphi}{\sqrt{(l\cos\varphi + S)^2 + D^2(\sin\varphi)^2}} + \sin^{-1}\frac{L_2\sin\varphi}{\sqrt{(l\cos\varphi + S)^2 + D^2(\sin\varphi)^2}}$$

wherein $\varphi$ is a desired turn angle from the rear of the final trailer to direct the final trailer in the desired direction, S is a fixed calibratable value that represents the look-ahead steering distance, D is the longitudinal distance between the first trailer-final trailer hitching point and the center point of final trailer axle(s), $L_2$ is the longitudinal distance between the center point of first trailer axle(s) and the first trailer-final trailer hitching point, and l (small) is the longitudinal distance between the center point of final trailer axle(s) and the final trailer camera installation point.

9. The multi-trailer reverse assist system of claim 8, further comprising:
- a vehicle rear view camera for estimating the actual first HAA angle $\theta_1$;
- an intermediate trailer camera for estimating the actual second HAA angle $\theta_2$; and
- a final trailer camera for providing the view of the environment behind the final trailer.

10. The multi-trailer reverse assist system of claim 6, wherein the controller is configured to continuously calculate controllable intermediate trailer steering angles ($\delta_T$) for directing the articulated transport system to direct the final trailer in the desired direction based on:

$$\delta_T = -K_2(\theta_{d2} - \theta_2)$$

wherein $K_2$ is a constant, $\theta_{d2}$ is a desired second HAA angle, and $\theta_2$ is an actual second HAA angle.

11. A method in a vehicle having a multi-trailer reverse assist system for use with an articulated transport system comprising the vehicle, an intermediate trailer, and a final trailer, the method comprising:
- receiving a view of an environment behind the final trailer;
- displaying the view in a user interface device;
- receiving, via a secondary steering device of the user interface device, a user intended direction of travel of the articulated transport system in reverse to direct the final trailer in a desired direction; and
- continuously calculating controllable steering angles for directing the articulated transport system to direct the final trailer in the desired direction;

wherein the calculated controllable steering angles are used to direct the final trailer in the desired direction.

12. The method of claim 11, wherein the articulated transport system includes steering control in both the vehicle and the intermediate trailer, and further comprising:
continuously calculating controllable steering angles for the steering control in both the lead vehicle and the intermediate trailer for directing the articulated transport system to direct the final trailer in the desired direction.

13. The method of claim 11, wherein the articulated transport system includes steering control in the vehicle, and further comprising:
continuously calculating controllable steering angles for the steering control in the lead vehicle for directing the articulated transport system to direct the final trailer in the desired direction.

14. The method of claim 11, further comprising continuously calculating controllable steering angles for directing the articulated transport system to direct the final trailer in the desired direction based on hitch articulation angle (HAA) estimations or measurements for a first HAA between the vehicle and the intermediate trailer and HAA estimations or measurements for a second HAA between the intermediate trailer and the final trailer.

15. The method of claim 14, further comprising continuously calculating controllable lead vehicle steering angles ($\delta_V$) for directing the articulated transport system to direct the final trailer in the desired direction based on:

$$\delta_V = K_1(\theta_{d1}-\theta_1)+K_3(\theta_{d2}-\theta_2)$$

wherein $K_1$ and $K_3$ are constants, $\theta_{d1}$ is a desired first HAA angle, $\theta_1$ is an actual first HAA angle, $\theta_{d2}$ is a desired second HAA angle, and $\theta_2$ is an actual second HAA angle.

16. The method of claim 15, further comprising continuously calculating the desired first HAA angle $\theta_{d1}$ based on:

$$\theta_{d1} = \sin^{-1}\frac{L_1\sin\theta_2}{\sqrt{(L_2\cos\theta_2+D)^2+L_1^2(\sin\theta_2)^2}} + \sin^{-1}\frac{d\sin\theta_2}{(L_2\cos\theta_2+D)^2+L_1^2(\sin\theta_2)^2}$$

wherein d (small) is the longitudinal distance between the lead vehicle's rear axle center and vehicle-first trailer hitching point, D is the longitudinal distance between the first trailer-final trailer hitching point and the center point of final trailer axle(s), $L_1$ is the longitudinal distance between vehicle-first trailer hitching point and center point of first trailer axle(s), $L_2$ is longitudinal distance between the center point of first trailer axle(s) and the first trailer-final trailer hitching point, and $\theta_2$ is an actual second HAA angle.

17. The method of claim 15, further comprising continuously calculating the desired second HAA angle $\theta_{d2}$ based on:

$$\theta_{d2} = \sin^{-1}\frac{D\sin\varphi}{\sqrt{(l\cos\varphi+S)^2+D^2(\sin\varphi)^2}} + \sin^{-1}\frac{L_2\sin\varphi}{\sqrt{(l\cos\varphi+S)^2+D^2(\sin\varphi)^2}}$$

wherein $\varphi$ is a desired turn angle from the rear of the final trailer to direct the final trailer in the desired direction, S is a fixed calibratable value that represents the look-ahead steering distance, D is the longitudinal distance between the first trailer-final trailer hitching point and the center point of final trailer axle(s), $L_2$ is the longitudinal distance between the center point of first trailer axle(s) and the first trailer-final trailer hitching point, and l (small) is the longitudinal distance between the center point of final trailer axle(s) and the final trailer camera installation point.

18. The method of claim 17, further comprising:
estimating the actual first HAA angle $\theta_1$ using a vehicle rear view camera;
estimating the actual second HAA angle $\theta_2$ using an intermediate trailer camera; and
receiving the view of the environment behind the final trailer from a final trailer camera.

19. The method of claim 14, further comprising continuously calculating controllable intermediate trailer steering angles ($\delta_T$) for directing the articulated transport system to direct the final trailer in the desired direction based on:

$$\delta_T = -K_2(\theta_{d2}-\theta_2)$$

wherein $K_2$ is a constant, $\theta_{d2}$ is a desired second HAA angle, and $\theta_2$ is an actual second HAA angle.

20. A vehicle having a multi-trailer reverse assist system for use with an articulated transport system comprising the vehicle, an intermediate trailer, and a final trailer, the vehicle comprising:
a vehicle rear view camera for estimating a first hitch articulation angle (HAA) angle $\theta_1$ between the vehicle and the intermediate trailer;
an intermediate trailer camera for estimating a second HAA angle $\theta_2$ between the intermediate trailer and the final trailer;
a final trailer camera for providing a view of an environment behind the final trailer; and
a controller configured to:
receive the view of the environment behind the final trailer from the final trailer camera;
cause the view to be displayed in a user interface device;
receive, via a secondary steering device, a user intended direction of travel of the articulated transport system in reverse to direct the final trailer in a desired direction;
continuously calculate controllable steering angles comprising controllable lead vehicle steering angles ($\delta_V$) and controllable intermediate trailer steering angles ($\delta_T$) for directing the articulated transport system to direct the final trailer in the desired direction based on the first HAA angle $\theta_1$ between the vehicle and the intermediate trailer measured using angular sensors or estimated using the vehicle rear view camera and the second HAA angle $\theta_2$ between the intermediate trailer and the final trailer measured using angular sensors or estimated using the intermediate trailer camera; and
control the articulated transport system to direct the final trailer in the desired direction using the calculated controllable steering angles.

* * * * *